Oct. 25, 1966  J. B. CHURCHILL  3,280,730
SELECTIVE PRINTING DEVICE WITH WEB FEEDING AND RETAINING MEANS
Filed Jan. 20, 1964  6 Sheets-Sheet 1

United States Patent Office 3,280,730
Patented Oct. 25, 1966

3,280,730
SELECTIVE PRINTING DEVICE WITH WEB
FEEDING AND RETAINING MEANS
John B. Churchill, Oak Park, Ill.
(1430 East Ave., Rochester, New York)
Filed Jan. 20, 1964, Ser. No. 338,676
3 Claims. (Cl. 101—94)

This invention relates to recording devices particularly to a travel expense recorder.

An object of the invention is to provide a travel expense recorder in a form of a small portable unit of a size convenient to carry in one's pocket, containing printing mechanism for identifying and printing a record of the various items of travel expense in a convenient manner, for subsequent use in making travel expense reports and for use in connection with income tax reports.

Another object of the invention is the provision of a small portable recorder for travel expenses containing a paper sheet movable through a printing position having a plurality of printing members manually movable into printing position for printing the amount of a travel expense on the sheet contained in the casing and means for identifying the nature of the expense.

A further object of the invention is to provide a travel expense recorder having a plurality of printing members in strip form with handles projecting through and to the outside of the casing containing the printing members so they may be adjusted to position a selected printing element in printing position over a paper sheet supported by a printing platen with an operating lever for moving the platen and printing members into printing position to print the characters in the printing position on the paper sheet and then feed the paper sheet into a new position between the printing members for a subsequent printing operation for use in recording travel expense items in printed record form in the casing.

Another object of the invention is to provide a travel expense recorder having a casing with a removable cover in which a roll of paper mounted on a spool may be detachably mounted in one end of the casing at one side of a movable platen member with a winding spool at the other side of the platen member for winding the strip from the supply spool with a plurality of printing slides having a plurality spaced printing elements extending longitudinally on each slide with manually operable means for adjusting each slide in the casing to selectively locate one of the printing members in printing position so that travel expenses with an identifying code may be printed on the paper strip in the printing position through manual operation of a lever mounted in the casing and extending through an opening in the cover with means for feeding the paper strip also operable by the lever at the end of the printing operation.

These and other desirable objects may be attained in the manner disclosed as an illustrative embodiment of the invention in the following description and in the accompanying drawings forming a part hereof, in which.

Figures 1, 3:
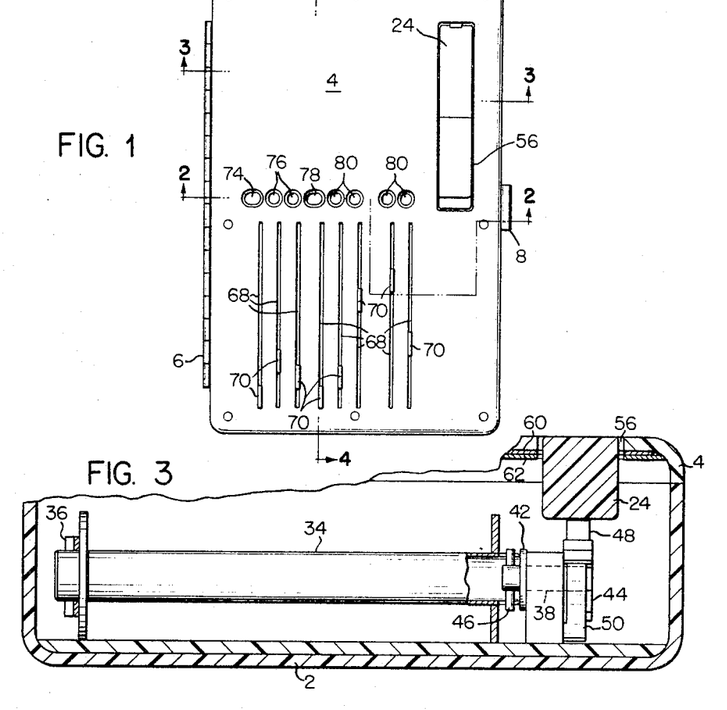
FIG. 1 is a plan view showing the outside of the cover of a travel expense recorder constructed according to the present invention.
FIG. 3 is a transverse cross section on an enlarged scale taken substantially along line 3—3 of FIG. 1 showing the receiving spool mounting and ratchet feed device.

The travel expense recorder provided by the first embodiment of the present invention is constructed of a size smaller than that shown in FIG. 1 and about equal to the size of the ordinary cigarette package. The recorder made according to this first embodiment of the invention will now be described with reference to FIGS. 1–6. It has a casing 2 formed with a bottom wall, end walls and side walls of imperforate integral form with the top open. A cover 4 is detachably mounted on casing 2, for example by means of the hinge connection 6 along one side of the cover and casing and a conventional detachable latch mechanism 8 mounted in the center portion along the opposite side walls of the cover and casing from the hinge connection. The casing and cover may be formed of any suitable material such as plastic, sheet metal, or the like.

Figure 2:
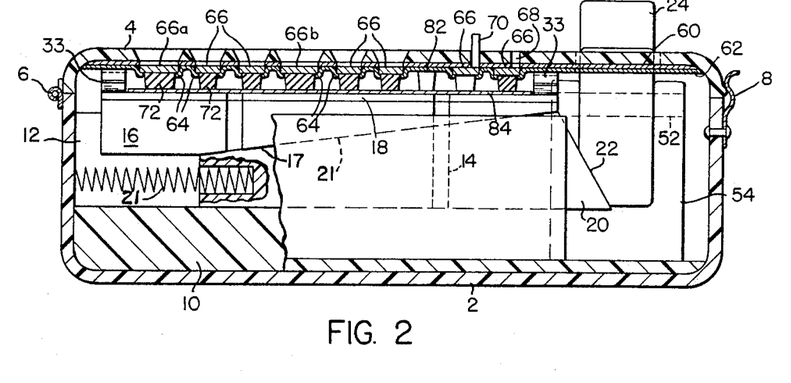
FIG. 2 is a transverse cross section on a substantially enlarged scale taken approximately on line 2—2 of FIG. 1 showing the platen, platen support and associated parts in the printing position.
Figure 4:
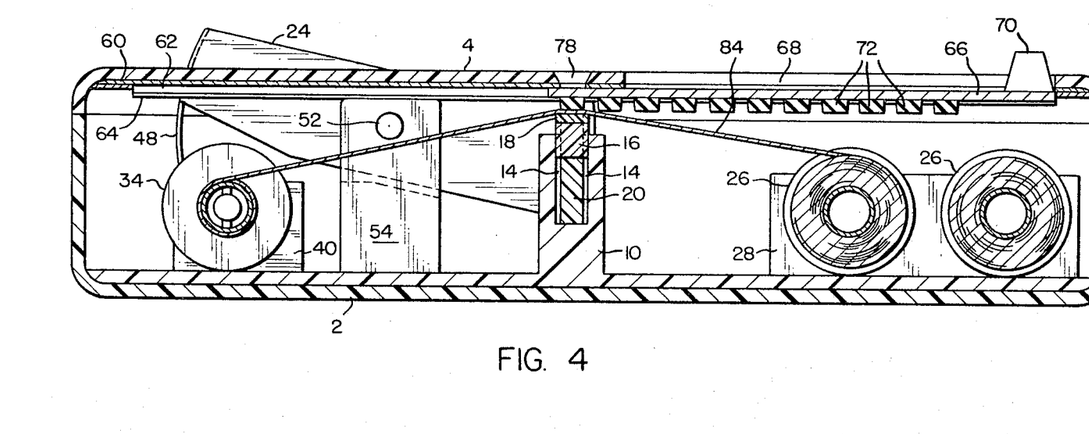
FIG. 4 is a longitudinal cross section on an enlarged scale taken substantially on line 4—4 of FIG. 1.
Figure 5:
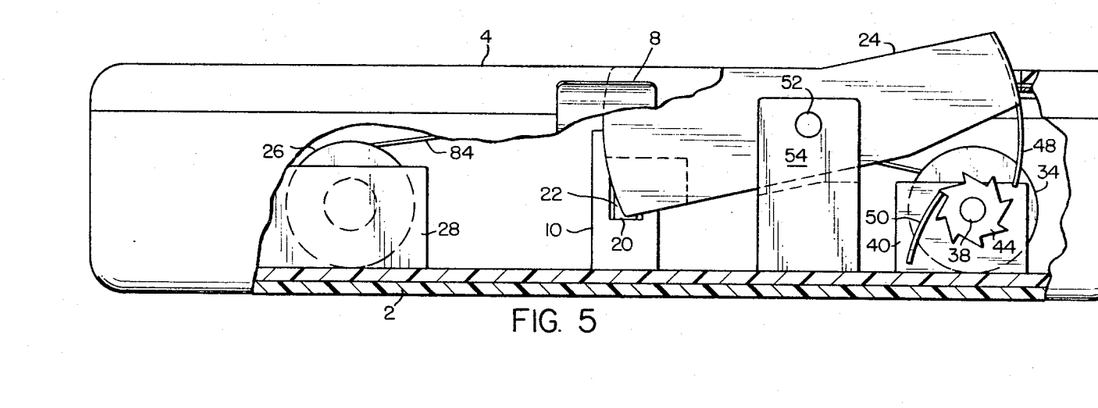
FIG. 5 is a side elevation of the recorder with portions broken away to show the ratchet feed for the paper strip.

A transversely extending platen support 10 is formed or mounted on the bottom wall of the casing 2 and one side wall thereof in the central portion of the casing having the opposite end of the platen support terminating in spaced relation from the other side wall of the casing, as shown in FIG. 2. The platen support 10 is formed with a longitudinally extending guide channel 12 opening through the upper edge of the support. The inner walls of the platen support forming the guide channel 12 are provided with inwardly extending vertical guide ribs 14 in opposed relation. A platen member 16 is mounted in the upper end of guide channel 12 and has opposite sides formed with guideways for receiving the guide ribs 14 therein to slidably mount the plate nmember for vertical sliding movement in the guide channel 12 of the platen support 10. The upper end of the platen member 16 where it may be formed of plastic material or soft metal is provided with a hardened metal platen bar 18 to provide a hard flat surface for supporting the paper sheet which receives the expense record in printing position thereon. Where a type of printing is used with the present invention in which a hard metal platen bar 18 is found to be undesirable, this bar may be replaced by any other suitable form of platen bar or strip having the desired degree of hardness or other quality that will facilitate its use in supporting a paper sheet in printing position to receive printed impressions of the characters on the type faces of the printing members hereinafter described.

A cam member of wedge bar 20 is slidably mounted between vertical guide ribs 14 in the bottom portion of guide channel 12 in platen support 10 between platen member 16 and the platen support 10 at the bottom of the guide channel 12. The wedge bar 20 is longitudinally slidable in the guide channel 12. The contacting faces of the platen member 16 and the wedge bar 20 are formed with complimentary interengaged cam surfaces 17 on the bottom face of the platen member 16 and 21 on the top face of the cam member 20. These cam surfaces provide an incline of a character that provides for longitudinal movement of the wedge bar 20 to the left as shown in FIG. 2 for moving the platen member 16 upwardly to obtain a printing operation on the paper extending over the upper face of the platen bar 18. The wedge bar 20 is normally operated in the guide channel 12 to the right, as shown in FIG. 2, by any suitable means such as a compression spring 21 extending between the left hand end of the wedge bar 20 and an adjacent portion of the platen support 10. The other end at the right hand side of FIG. 2 is formed with an inclined cam surface 22 for engagement with a complimentary cam surface on the lower front end of the operating lever or rock lever 24.

The casing 2 is formed at the front end with a spool support for rotatably mounting a pair of paper supply spools carrying paper strips for use in keeping the printed record of the expense account. The front spool support is for supply spools 26. A supporting flange 28 extends upwardly from the bottom wall of the casing 2 and extends from adjacent the front end wall rearwardly in longitudinal relation and is spaced inwardly from the adjacent side wall of the casing. This supporting flange 28 is formed with a pair of spaced recesses each adapted to receive the hub portion at one end of one of the spools 26.

Figure 6:
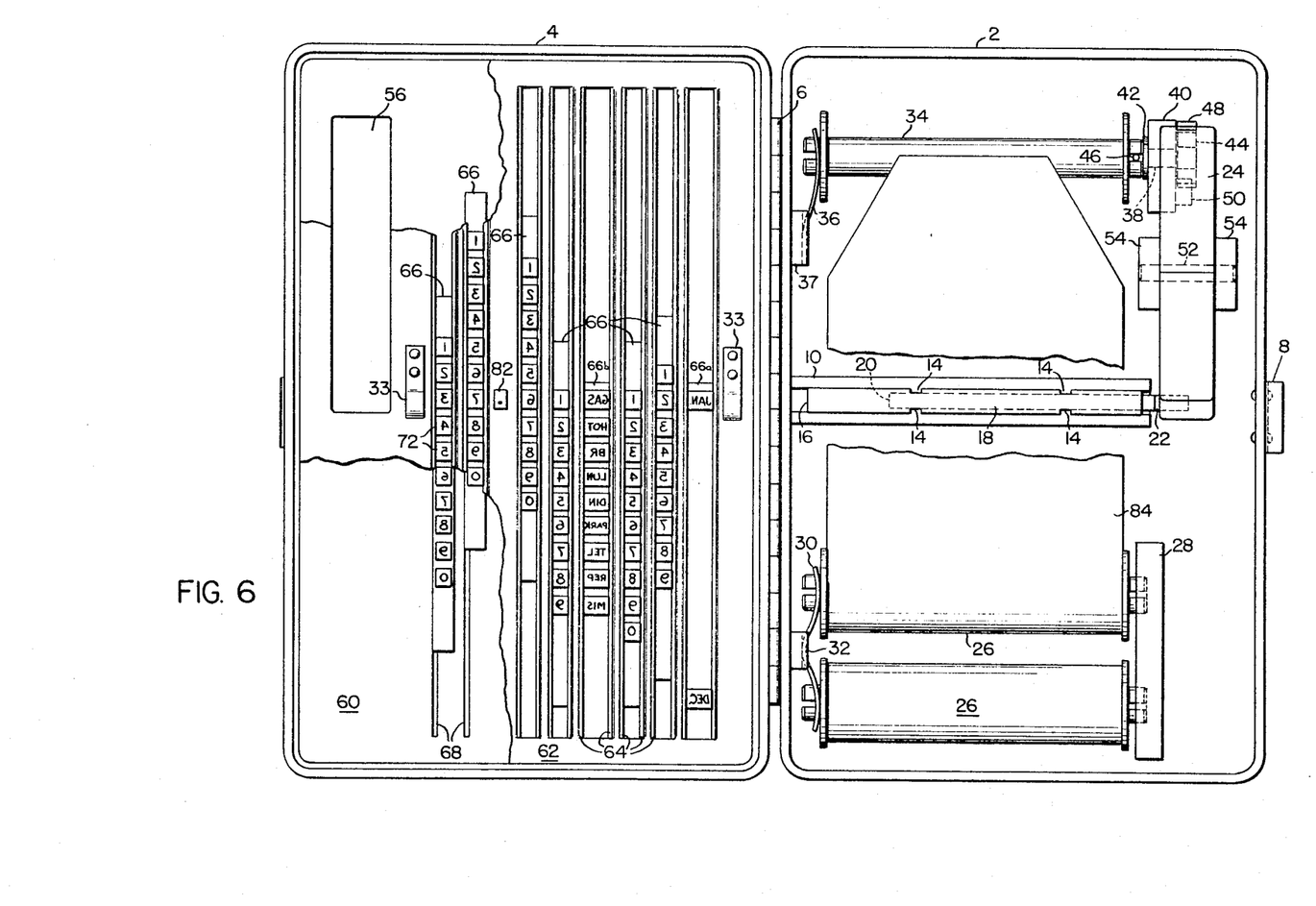
FIG. 6 shows the travel expense recorder with the cover in open position showing the bottom inside face and showing a plan view of the casing.
Figure 7:
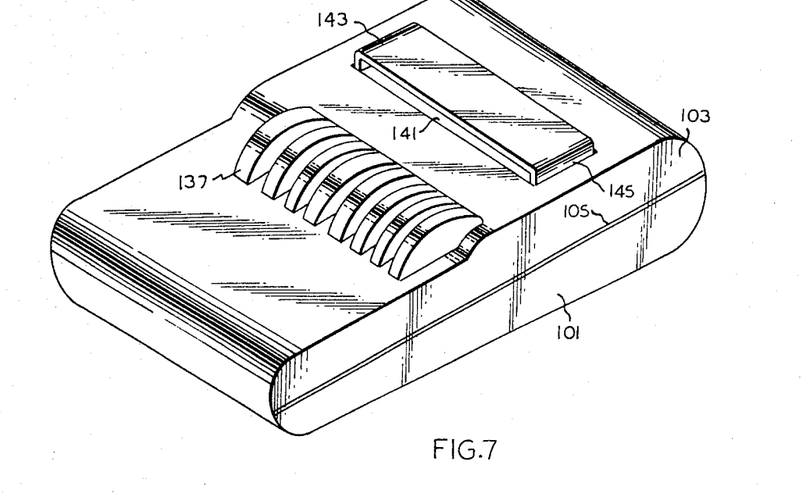
FIG. 7 is a perspective view of a modified form of device, constituting a second embodiment of the invention.
Figure 8:
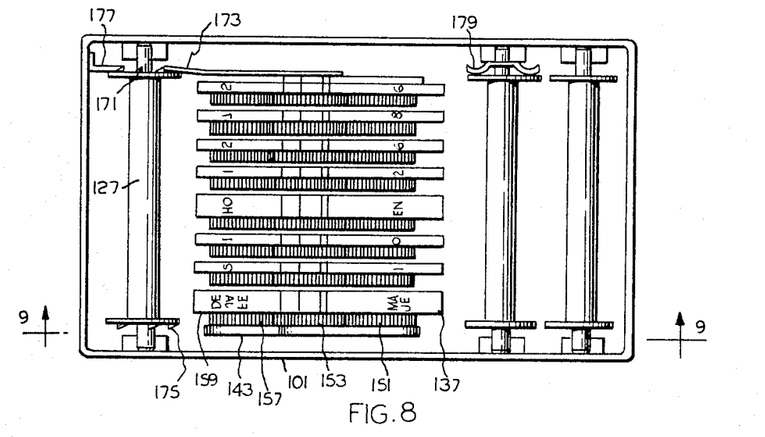
FIG. 8 is a plan thereof with the cover section of the casing removed, but nevertheless showing the normal working position of the setting wheels, printing wheels, and associated parts which are mounted in the cover section.

The opposite ends of the hub portions of the spools 26 engage in bearing apertures in the opposite ends of bearing spring 30 having the central portion secured to the boss 32 on the side wall of the casing 2 carrying the hinge connection 6, as shown in FIG. 6. The supply spool support is mounted in the casing 2 so that the spools 26 are freely rotatable in the bearings in the supporting flange 28 and the bearing spring 30. The paper strip on one of the spools provides an extra supply for use when the paper supply on the other spool 26 is exhausted. The extra supply spool is usually positioned adjacent to front end wall of the casing while the supply spool spaced inwardly from the front wall of the casing has the end of the strip thereon extended rearwardly over the platen member 16 and the platen bar 18 and attached to the receiving or winding spool 34.

The winding spool 34 has the left hand end, as shown in FIG. 6, mounted in bearing spring 36 at one end while the opposite end of the bearing spring is secured to the boss 37 on the side wall of the casing 2 carrying the hinge 6 and is located on the same side wall as the boss 32 at the front portion of the casing. The hubs at opposite ends of the receiving or winding spool 34 are slotted and are recessed to receive the drive shaft 38 of the strip winding or feeding mechanism rotatably supported in post 40 mounted on the bottom wall of the casing 2 near the rear end wall thereof and spaced inwardly from the side wall at the right hand side of the casing, as shown in FIG. 6.

The inner end of the drive shaft 38 carries a bearing flange 42 to retain the drive shaft against endwise movement in the post 40 while the ratchet wheel 44 is mounted on the other end of the drive shaft 38 at the opposite side of the post 40. The inner end of the drive shaft 38 projects inwardly beyond the bearing flange 42 and carries a transversely extending drive pin 46 formed and positioned to engage in the slots in one end of the receiving or winding spool 34 to provide a driving connection with the spool for rotating the spool to wind the paper strip on the spool when the ratchet wheel 44 is rotated.

The bearing springs 30 and 36 respectively, operate the supply and receiving spools in an endwise direction toward the opposite bearing and supporting portions for the spools. The bearing spring 36 retains the slotted end of the spool hub of the receiving spool 34 engaged with the drive pin 46 on the drive shaft 38. The spools may be removed from their supports by manually moving the spool toward the springs to flex the springs for disengaging the opposite end of the spool from the bearing support after which the hub of the spool mounted in the bearing springs can be removed from its bearing support in the springs. New supply spools may then be inserted in the supply spool supporting structure. The receiving or winding spool 34 is removed from the drive shaft 38 and bearing spring 36 so that a paper strip carried thereby can be removed from the casing and the receiving spool for replacement either with the same or another receiving spool for winding another strip of paper thereon. The spools 26 and 34 may be duplicate spools so that as soon as the paper strip on one spool has been discharged from the supply spool onto a receiving spool 34, the empty supply spool 26 may then be used to provide a new receiving spool 34.

The rear end of operating or rock lever 24 carries a ratchet wheel operating arm 48 positioned to engage the teeth on the ratchet wheel when the rear end of the rock lever 24 is moved downwardly toward the bottom of the casing for rotating the ratchet wheel 44. The ratchet wheel is moved an amount sufficient to feed the transverse portion of the paper strip which has just received a printed impression, out of the printing position. The ratchet wheel also moves a new portion of the strip into printing position to receive the next printing operation thereon. The inner rear end of the operating or rock lever 24 is formed to engage the adjacent end of post 40 so that its movement is limited to feed the desired amount of paper strip over the platen member to receive the next line of printing.

A retaining spring 50 is mounted on the post 40 at one end and has the free end resiliently engaging the teeth on the ratchet wheel 44 for preventing the ratchet wheel, the drive shaft 38 and the receiving spool 34 from rotating in a reverse direction to that provided for feeding the strip and winding it on the spool 34. It will also be understood that the bearing springs 30 and 36 frictionally engage the flanges on the supply and receiving spools to aid in preventing rotation of the spools so that the paper thereon will not unwind when it is not desired. The bearing spring 30 provides sufficient tension on the paper strip extended to and connected with the receiving spool 34 to hold it under sufficient tension so it will not slip over the platen member 16 and for normally moving the platen member toward the bottom of the casing. It may be found desirable to positively operate the platen member 16 away from the type faces by means for example, such as leaf springs 33.

The operating lever 24 is mounted in longitudinally extending relation adjacent the side wall at the right of the casing 2 as shown in FIG. 6 and is rotatably mounted in the central portion on the supporting pin 52 mounted in the lever supporting post 54 on opposite sides of the lever. The lever supporting post 54 has a slot to receive the lever 24 in the upper end while the lower end is mounted on the bottom wall of the casing 2 and extends upwardly therefrom toward the open top portion of the casing in providing the support for the operating or rock lever 24. The outer or upper marginal portion of the operating or rock lever 24 is located in an opening 56 in the cover 4 so that one end of the rock lever projects outwardly beyond the top surface of the cover 4 of the casing while the top surface at the other end will not project beyond the cover. This construction of the lever is such that the projecting portion is operated in the use of the recorder in a manner to be hereinafter described.

It will be understood that while the platen support, spool supports, ratchet feed and operating lever are described hereinabove as being mounted on the bottom of the casing 2, they may also be mounted on a separate plate which may be removably mounted in the casing.

A backing plate 60 is secured to the inner face of the cover and is used to provide a rigid support for the printing mechanism. A slide retaining plate 62 is mounted on the inner face of the backing plate 60 and is formed with a plurality of pairs of spaced parallel guide flanges 64 extending inwardly from the backing plate 62 to provide guideways for slidably receiving a plurality of spaced parallel printing members or elements 66. The printing members 66 are in the form of elongated metal strips or the like adapted to slide longitudinally on the inside of the cover against the backing plate 60. The cover 4 has the front end portion provided with a plurality of slots 68. Each slot is located adjacent one side edge of one of the printing members or strips 66 so that an operating handle 70 mounted on the front end of the strip 66 can be manually engaged for sliding a selected strip longitudinally in the guideway formed by the guide flanges 64 to position it in a selected position on the cover with a selected portion opposite the printing position provided by the platen member 16. Each strip 66 is provided with a plurality of printing elements 72 on the inner face thereof having the inner end opposite that attached to the printing member 66 provided with a suitable indicia to be printed on the paper strip.

In providing a travel expense recorder according to the present invention, some of the printing strips 66 may be slightly wider than the others in order to carry suitable letters or code indicia for identifying different types of travel expense items and also for identifying the months of the year. For the purpose of the present invention and for example, the printing member or strip 66a will be one of the wider strips and will have suitable letter characters thereon to represent abbreviations for the months of the year. The abbreviation for each month of the year will extend transversely across the strip from side to side and each month abbreviation will be arranged in longitudinal relation along the strip from the rear end toward the front end. For example, the letters JAN will be applied to the outer face of the printing strip 66a so as to be visible through an aperture 74 located in printing position over the platen member 16 to indicate when the printing element 72 containing the same letters is in printing position for printing the abbreviation for the month on the section of the paper strip, over the platen member. The other printing elements containing printing indicia representing the other months of the year will be mounted in a predetermined spaced relation toward the front of the strip 66a so that operation of the handle 70 will facilitate the positioning of the printing element for any month of the year in the printing position when the index indicia shown on the outer face of the strip is visible through the aperture 74 in the cover and backing plate 60. The next two printing members or strips 66 adjacent to the strip 66a will have the printing elements provided in longitudinally extending relation thereon arranged with numerical characters starting with the character 1 at the rear end portion of each strip and progressing numerically to the character 9 toward the front end of the strip and will then have a final character near the front end of the strip for printing 0. By operating the handle 70 for either of these two strips will provide for positioning one of the numeral printing elements 72 in position to print the number for the day of the month opposite the abbreviation for the month printed by the printing element on the strip 66a. Apertures 76 extend through the cover and backing plate 60 to expose numerical indicia on the outer face of each of the pair of strips adjacent the strip 66a for indicating the number to be printed on the paper strip in the printing position by the printing elements 72.

A wide printing strip 66b adjacent the date printing strips will be provided with a plurality of letter indicia to form abbreviations or a code to indicate various types of travel expense, such as gasoline for use in automobiles, taxi fares, hotel bills, food, etc. The printing element 72 mounted on the printing strip or member 66b will be arranged to print one of a plurality of abbreviations or code indicia on the paper recording strip in the portion engaged with the platen member 16 in printing position. By operating the handle 66 on the strip 66b the printing strip may be adjusted to position the desired abbreviation or indicia in printing position. The outer face of the strip is provided with similar indica for observaton through the aperture 78 in the cover 4 and backing plate 60 at the printing position.

This leaves four remaining printing strips or members 66 each of which are provided with printing elements 72 arranged in spaced longitudinal relation along each strip and having the numerals 1 to 9 inclusive and 0 provided thereon for printing the desired numeral on the paper strip in printing position according to the selected position of the strip through operation of the handle 70. An aperture 80 is formed in cover 4 and backing plate 60 over each of these four remaining printing strips applied to the outer face there-of so as to indicate which printing element and indicia thereon is in the printing position. The pair of printing members 66 at the opposite side of the group of printing members from printing member 66a are spaced a slightly greater distance apart from the adjacent pair of printing members so that a printing element 82 may be mounted on the inner face of the slide retaining plate 62 in fixed position and in the printing position for carrying a printing character thereon to represent a period. With this printing element 82 arranged between adjacent pairs of printing elements 66, it will be understood that the pair of printing elements adjacent printing element 66b will be used to indicate dollars while the other two printing elements at the opposite side of the printing element 82 will be used to represent cents.

The printing strip 66b and the four printing strips to the right thereof when viewed from the top of the cover through the apertures 80 and the printing element 82 will enable the user to print an identification for the item of travel expense and the cost thereof in dollars and cents up to ninety-nine dollars and ninety-nine cents.

With a paper recording strip 84 mounted on the inner supply spool 26 with the free end attached to the receiving or winding spool 34, and the cover closed, the expense recorder is ready for operation to record travel expense and the date thereof. Any suitable printing paper may be used for paper recording strip 84 some of which may require suitable inking mechanism for the type faces on the printing element 72 of a conventional character which may be applied on the inner side of the cover adjacent the printing position. If an inking device is used the type faces will be run back and forth over an inking pad of suitable character, not shown, so as to provide sufficient ink to print the character on the paper in the printing position. However, a printing paper which does not require the use of an inking pad or ink on the type faces provided on the printing elements 72 is desirable for use in connection with the present invention. A suitable printing paper of this character which does not require inking of the type faces is commercially available for use in connection with the present invention.

The user of the invention in making a record of travel expense will first set the printing strip 66a to position the proper month of the year in printing position and then will set the next two strips to position the numeral or numerals indicating the day of the month in printing position. Then, the printing strip 66b containing an abbreviation or code indication for the expense item of travel will have the desired indicia placed in printing position together with operation of the two pairs of strips adjacent the strip 66b for indicating the expense of the item.

All of the printing strips 66 are operated by manually engaging the handle 70 on each printing strip to position the desired printing element in printing position as indicated by the indicia on the strip registering with the apertures over the strip formed in the cover 4. When all of the strips have been set to indicate the date, the expense item and the amount of the expense in the printing position, the user of the device then presses the forward upwardly projecting end of the operating or rock lever 24 downwardly.

As the forward end of the operating lever 24 is moved downwardly, the cam face on the forward end engages the cam surface 22 on the wedge bar 20 and moves it to the left, as shown in FIG. 2. This operation moves the platen member 16 upwardly to engage the paper on the upper face of the platen bar 18 with the printing characters on the lower ends of the printing elements 72 in printing position. This will result in printing a record of the date, the item identification for expense and the amount of the expense on the paper strip 84 including the period between the numerals indicating dollars and cents for the expense.

When this downward movement of the front end of operating lever 24 is completed to obtain the printing on the recording strip 84 in the printing position, the user then presses the rear end of the lever 24 downwardly. In pressing the forward end of the lever 24 downwardly, it will be understood that the rear end of the lever was projected upwardly and outwardly beyond the outer surface of the cover 4.

In pressing the outwardly projecting rear end of the lever 24 downwardly, the ratchet wheel operating arm 48 will have the free end thereof engage a tooth on the ratchet wheel 44 and rotate it sufficiently to feed the paper recoding strip 84 for winding a portion on to the receiving spool 34 sufficient to move the printed data on the strip out of printing position toward the receiving spool and position a fresh portion of the strip in printing position for receiving the next expense item and the date thereof. The post 54 has the portion at the bottom of the slot receiving the lever 24 formed to limit downward movement of the rear end of lever 24 for limiting the amount the paper is fed toward the receiving spool. By resetting the various printing members 66 through manual operation thereof, additional expense items on either the same date or other dates can be printed on the recording strip in successive lines across the strip to keep a record of travel expense items.

The present invention provides the user with a small portable self-contained travel expense recorder that is handy and convenient to use for recording travel expenses at the time of paying the expense. The invention is particularly useful for recording expenses where at the time of payment a receipt for the expense is not given by the person to whom the expense is paid. It will be understood that the invention may also be used for recording many different items of expense for keeping tax records and for reporting expenses to an employer in a very convenient and usable manner with a small portable device that can easily be carried on the person and a device that can be manufactured at an economical cost. The present invention also provides a device that for its size and the character of operation it is constructed to perform, is rather simple and has structural features that are not likely to get out of order.

Reference is now made to FIGS. 7–11, showing a modified construction which is somewhat simpler than the embodiment first described and which, under many circumstances, may be regarded as the preferred embodiment of the invention.

Figure 11:
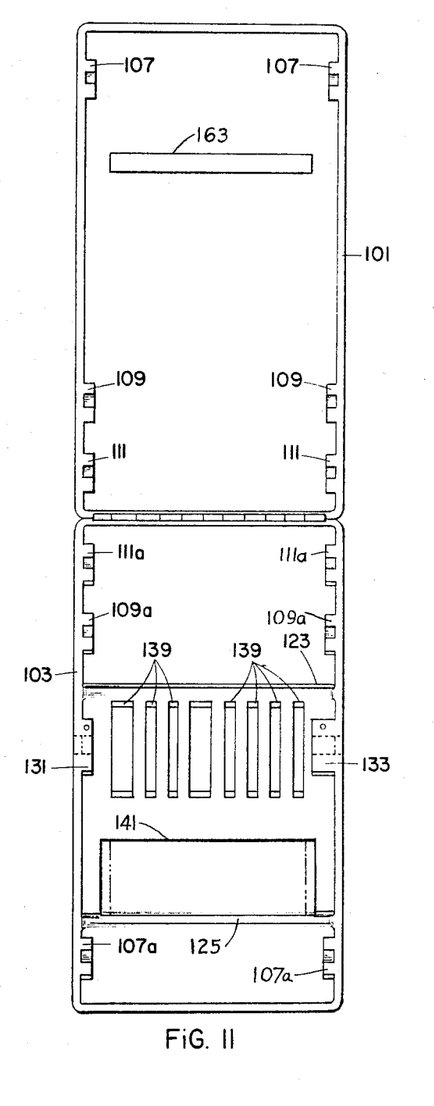
FIG. 11 is a plan of the top and bottom sections of the casing opened up relative to each other and laid flat to show their respective inner faces, with the mechanism removed.

In the second embodiment, the case or housing comprises a lower part or base portion 101 and an upper part or cover portion 103, joining each other at a parting line 105 and suitably held together by hinges, screws, or other conventional fastening means, the details of which are not important for purposes of the present invention. Preferably both the base and the cover are made of molded plastic material. FIG. 11 shows the two parts opened up relative to each other, with the interior mechanism removed for better showing of the shape of the case of housing itself.

Molded integrally with and projecting laterally inwardly from the side walls of the base or bottom section 101, in positions directly opposite each other so as to form pairs, are the three pairs of bosses 107, 109, and 111, respectively, each having a lateral semicylindrical groove in its top surface. Similar molded bosses project inwardly from opposite sides of the top or cover section 103, the bosses on the cover section being positioned so as to come down on top of and tight against the bosses of the bottom section when the cover and the bottom are in assembled relation to each other, the bosses on the cover section being respectively indicated at 107a, 109a and 111a. These bosses likewise have semicylindrical lateral grooves which complement the similar grooves in the bosses of the base section, to form journals or bearings for transverse shafts, when the parts are in closed position.

The bosses 111 and 111a form the bearings for the ends of the shaft 113 of a spare paper spool 115. The bosses 109 and 109a together form the bearings for the shaft 117 of the active paper spool 119, from which a web of paper shown at 121 (FIG. 9) is unwound and extends under the bottom edge of a first hold-down flange 123 which is mounted on and projects downwardly from the top wall of the cover section 103. The web 121 of the paper continues onward, passes under the bottom edge of a second hold-down flange 125 similarly depending from the top wall of the cover, and is wound up onto a takeup spool 127, the shaft of which is cooperating journalled in the cooperating semicylindrical grooves of the bosses 107 and 107a.

Another pair of bosses 131 and 133 are formed on the inner faces of the depending side flanges of the cover section 103, about midway of the length of the casing. These bosses 131 and 133 are formed with lateral cylindrical openings which constitute bearings for a transverse shaft 135, on which are journaled a series of manual setting wheels 137 of such diameter that the upper edges of these wheels extend upwardly through slots 139 in the top wall of the cover, to a sufficient extent to be engaged by the thumb or finger in order that the wheels may be easily turned.

Forwardly of the slots 139 through which the edges of the wheels 137 extend, there is a large transverse slot 141 in the top wall. Extending upwardly through this slot is the push bar assembly, which comprises a long broad flat bar 143 extending across almost the full width of the casing, the ends being bent downwardly at 145 and thence extending rearwardly at 147 to form laterally spaced arms, the rear ends of which are journaled on the shaft 135 just outside of the outermost wheels 137. Thus the push bar assembly 143, 145, 147 may oscillate upwardly and downwardly on the shaft 135 as a center, and a compression spring 149 constantly tends to push it upwardly to its extreme limit of travel.

Each of the manual setting wheels 137 has fixed to one side thereof a gear 151. Each gear meshes with an intermediate or idler gear 153 journaled on a shaft 155 mounted in the side arms 147 of the push bar assembly. Each idler gear, in turn, meshes on its opposite side with a gear 157 fixed to a printing wheel or type wheel 159, the respective gears 157 and wheels 159 being rotatable on a transverse shaft 161 which is mounted in the arms 147 approximately directly under the accessible broad flat part or pressure applying part 143 of the push bar assembly. The printing wheels 159 carry on their respective peripheries, suitable indicia of numbers, letters, or combinations thereof, in the form of printing type faces slightly projecting from the peripheries of their respective wheels 159.

A platen 163 extends transversely across the bottom wall of the casing section 101, in a position parallel to and directly below the shaft 161, as well seen in FIG. 9. This platen may be a strip of semihard rubber or any other suitable material, cemented or otherwise secured to the top face of the bottom wall of the casing. The paper web 121 lies above the platen 163, between it and the printing wheels 159. It will be readily understood from FIGS. 9 and 10 that it downward pressure is applied to the push bar 143, sufficient to overcome the slight upward force of the spring 149, this will depress the shaft 161 of the printing wheels 159 and will carry the printing wheels downwardly against the paper web 121, compressing the paper 121 between the printing wheels and the platen 163. If the paper is of the pressure sensitive kind well known in the art (as is preferably the case) the pressure will cause a visible marking on the paper, corresponding to whatever characters or type faces on the wheels 159 happen to be alined with the platen 163 at the time that the downward motion of the printing wheels occurs. Of course if it is preferred not to use the pressure sensitive type of paper, any suitable known form of inking apparatus may be employed to ink the type characters on the wheels 159, or a sheet of carbon paper or an inking ribbon may be interposed between the printing wheels and the paper, the carbon paper or inking ribbon possibly being in the form of a continuous strip wound on the spool with the paper.

The setting wheels 137 are marked, by engraving or otherwise, with the same letters, numerals, or other indicia which are on the type wheels 159. The indicia on the setting wheels 137 are placed in such position on the peripheries of the respective wheels that when a particular indication appears at the top of the setting wheel 137, the corresponding printing type will be at the bottom of the corresponding printing wheel 159, directly over the platen 163, in position to print his particular indication on the paper web.

Any desired number of sets of setting wheels and printing wheels may be used, and the indication thereon may be arranged in any desired way. Conveniently, the first set of wheels at the left carry abbreviations for the names of the months, the next two sets of wheels carry numerals for indicating the day of the month, the next set of wheels carry suitable abbreviations to indicate the nature of the expenditure, such as hotel, meals, entertainment, fares, etc., and the last four sets of wheels carry numerals for recording amounts, the first two sets in these last four set of wheels carry numerals for recording amounts, the first two sets in these last four indicating dollars and the last two sets indicating cents.

The right hand flange of the takeup spool 127 has ratchet teeth 171 formed on its outside face, cooperating with the leaf spring 173 fastened to the right hand arm 147 of the push bar assembly so that the leaf spring swings up and down with the push bar assembly. The leaf spring is rigid in an up and down direction, but flexible in a lateral direction. The teeth 171 are such shape that during the downward motion of the push bar assembly, to make a printing impression, the spring 173 will ratchet idly over the teeth, causing no turning of the take-up spool. When downward pressure on the push bar is released and the spring 149 restores the push bar upwardly, the leaf spring 173 will catch one of the teeth 171 and and turn the take-up spool through one increment of motion, suffecent to feed the paper web slightly forwardly to bring a fresh portion thereof into printing position over the platen 163. There is a second leaf spring 177 suitably fixed in the casing and engaging the same ratchet teeth 171 to prevent reverse rotation of the takeup spool 127 by the friction of the spring 173 during the downward motion of the push bar. The flange at the opposite end of the takeup spool 127 may also have teeth 175 which are duplicates of the teeth 171, so the spool may be reversed end for end and it does not matter which way the user inserts the spool.

A corrugated washer or suitable leaf spring 179 is interposed between a fixed part of the casing and one end flange of the paper supply spool 119, allowing the spool to turn when necessary but providing a frictional drag or brake which maintains the required amount of tension on the paper web and prevents the paper from unwinding loosely.

With this arrangement, the user turns the setting wheels 137 with his thumb or finger, to bring the desired indications uppermost on these wheels, so as to show the date, the nature of the expense, and the amount of expense which is to be recorded. He then presses firmly downwardly on the push bar 143, so that the type characters on the printing wheels 159 come down firmly on top of the paper over the platen 163 and make the desired indication or recording on the paper. When the operator releases the downward pressure on the bar 143, the spring 149 restores it upwardly, at the same time causing the spring 173 to turn the takeup spool 127 to feed the paper slightly forwardly, ready for the next recording impression.

When the entire supply of paper on the supply roll 119 is used up, the operator opens up the case, swinging the cover 103 up away from the base 101. The various wheels are attached to the cover and come up with the cover, leaving the paper web and the spools readily accessible. The used strip of paper can be unwound from the takeup spool 127 and placed in the records of the salesman or other person using the device, and the spare spool 115 can be interchanged with the empty spool 119, the end of the web of paper being drawn from it and attached to the takeup spool 127 in a manner similar to the way the film in a camera is threaded onto the takeup spool thereof. The case is again closed and device is ready for continued operation.

This second form of device, like the form first described, is extremely compact. It has roughly the size of an ordinary package of cigarettes. It may conveniently be made with a length of about 4¾ inches, a width of about 2⅝ inches, and a maximum thickness or height of about 1 1/16 inches. Thus it will easily fit into the pocket of the user, so that he can quickly record his expenses on the spot, at the time they are incurred, overcoming the need for trying to remember the various expenses all day and then attempting to record them accurately at the end of the day.

Figure 9:
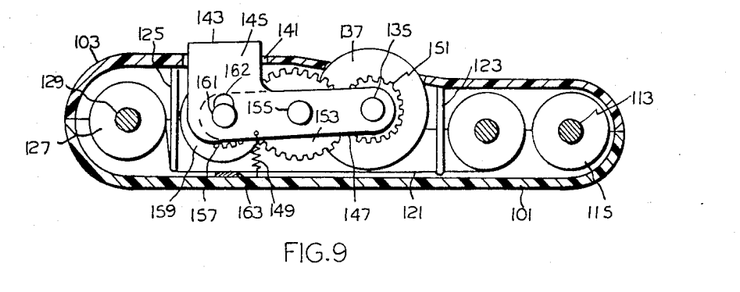
FIG. 9 is a vertical section taken approximately on the line 9—9 of FIG. 8.
Figure 10:
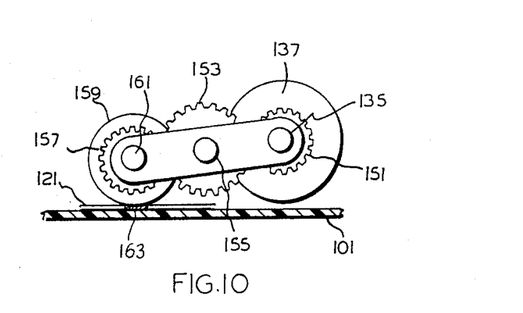
FIG. 10 is a view similar to a fragment of FIG. 9, with the parts in a different position with the printing wheels pressing downwardly on the paper to make a recording impression thereon.

It may be mentioned here that in case the upward stroke of the printing wheel shaft 161 does not allow sufficient upward motion of the member 145 and spring 173 to turn the takeup spool 127 a sufficient amount at each operation, the ends of the shaft 161 may be mounted in vertical slots 162 in the member 145, as shown in FIG. 9, thereby allowing the member 145 (and the spring 173 with it) to move upwardly and downwardly through a greater range or extent than that of the shaft 161. This enables the spring 173 to travel far enough to produce the required turning of the take-up spool, without increasing the depth of the case or housing.

It is seen from the foregoing disclosure that the objects and purposes of the invention are well fulfilled. It is to be understood that the foregoing disclosure is given by way of illustrative example only, rather that by way of limitation, and that without departing from the invention, the details may be varied within the scope of the appended claims.

What is claimed is:

1. A travel expense recorder comprising a casing having a bottom wall, upwardly extending side and end walls and open at the top, a cover detachably mounted on said casing for closing the opening at the top, a plurality of strip members slidably mounted in spaced parallel relation on the inner side of said cover, a plurality of printing members mounted in longitudinally extending relation along said strip members having printing characters facing inwardly toward the bottom wall of said casing in the closed position of said cover, a platen support mounted in transversely extending relation across an intermediate portion on the bottom wall of said casing, a platen member mounted on said platen support for movement toward and from said strip members in transversely extending relation under all of said strip members and forming a printing position, each strip member having an operating handle mounted on one end and projecting through a slot in said cover for manual engagement for sliding said strip member to position a selected printing member thereon in printing position, indicating means on each strip visible at the outer side of said cover for indicating when the selected printing member is in printing position, means in said casing movably supporting a paper strip for movement from one side of said platen member to the other to receive printed impressions from the printing characters on each of said strips in printing position, and manually operable means for moving said platen member to move said paper strip engaged thereover into printing contact with the printing characters on said strip members in printing position and feeding a new portion of said paper strip into printing position at the end of each printing operation, said recorder further comprising a wedge bar slidably mounted in said platen support between said platen member and said support, said wedge bar and platen member having complementary interengaged cam surfaces for moving said platen member to engage said paper strip with said printing characters in longitudinal movement of said wedge bar on said platen support, and said manually operable means being formed of a rock lever pivotally mounted at an intermediate portion in said casing with opposite ends projecting through an aperture in said cover for manual operation, said rock lever having portions thereof at one end interengaged with portions of said wedge bar at one end for moving said wedge bar for operating said platen member, and having portions at the opposite end for engaging and operating said means for supporting said paper strip for feeding said paper strip when said lever is moved in one direction, whereby manual operation of said rock lever will operate said platen member to print said paper strip with the characters on said strip members in printing position and feed said paper strip after each printing operation.

2. A compact portable travel expense recorder adapted to be carried in a person's pocket and comprising a hollow casing, means in said casing for holding a paper supply spool and a take-up spool in position to receive a web of paper extending from the supply spool to the take-up spool, movable impression-making members located at least partially within said casing, manually movable setting means accessible exteriorly of said casing and operatively connected to said impression-making members to move the same to selected positions, a manual operating member having an area accessible from the exterior of said casing, spring means tending to move said accessible area in an outward direction, means operated by inward movement of said accessible area of said operating member, as a result of inward manual pressure thereon, for causing relative movement of said web of paper and said impression-making members in a direction toward each other, to record on said web an impression of indicia dependent upon the position to which said impression-making members have been set by operation of said manually movable setting means prior to the inward pressure on said accessible area of said operating member, and means effective during outward return movement of said accessible area of said operating member for turning said take-up spool to bring a fresh portion of said web into position to receive the next recording impression, said impression-making members being in the form of rotary printing wheels having printing type faces on their respective peripheries and said manually movable setting means comprising rotary setting wheels having portions of their peripheries extending out through slots in the casing so as to be accessible exteriorly of the casing, each rotary setting wheel having a driving gear fixed thereto, each rotary printing wheel having a driven gear fixed thereto, and an intermediate idler gear operatively connecting each driving gear to a corresponding one of said driven gears.

3. A construction as defined in claim 2, in which said manual operating member is in the form of a U-shaped yoke having side arms pivoted for oscillation concentrically with the axis of rotation of said setting wheels, and in which said printing wheels are rotatably mounted on a shaft which is carried by said yoke in a position spaced from and substantially parallel to the axis of rotation of said setting wheels.

References Cited by the Examiner

UNITED STATES PATENTS

| 1,206,766 | 11/1916 | Standley et al. | 101—90 |
| 1,311,189 | 7/1919 | Standley et al. | 101—113 |
| 1,992,709 | 2/1935 | Matt | 101—90 |
| 1,994,431 | 3/1935 | May | 101—90 |
| 2,346,611 | 4/1944 | Rostock | 101—94 X |
| 2,352,907 | 7/1944 | Mangan | 101—94 X |
| 2,682,833 | 7/1954 | Gardinor et al. | 101—94 |
| 2,691,938 | 10/1954 | Bliss | 101—94 |

FOREIGN PATENTS 938,611 9/1958 Great Britain.

WILLIAM B. PENN, *Primary Examiner.*